US006657587B1

United States Patent
Mohan

(10) Patent No.: US 6,657,587 B1
(45) Date of Patent: Dec. 2, 2003

(54) TRACKING SYSTEM USING MINIATURIZED CONCEALABLE COMMUNICATIONS MODULE

(75) Inventor: Paul L. Mohan, Novi, MI (US)

(73) Assignee: Veridian ERIM International, Inc., Ann Arbor, MI (US)

( * ) Notice: Subject to any disclaimer, the term of this patent is extended or adjusted under 35 U.S.C. 154(b) by 0 days.

(21) Appl. No.: 09/571,899

(22) Filed: May 16, 2000

Related U.S. Application Data

(63) Continuation of application No. 08/321,941, filed on Oct. 12, 1994, now Pat. No. 6,121,922.

(51) Int. Cl.[7] .............................. G01S 5/02; H04B 7/185
(52) U.S. Cl. .............................. 342/357.1; 342/357.09; 342/419; 701/213
(58) Field of Search ...................... 342/357.09, 357.1, 342/419; 701/213

(56) References Cited

U.S. PATENT DOCUMENTS

| | | | |
|---|---|---|---|
| 5,043,736 A | 8/1991 | Darnell et al. | 342/357 |
| 5,115,223 A | 5/1992 | Moody | 340/573 |
| 5,223,844 A | 6/1993 | Mansell et al. | 342/357 |
| 5,225,842 A | 7/1993 | Brown et al. | 342/357 |
| 5,266,958 A | 11/1993 | Durboraw, III | 342/357 |
| 5,392,052 A | 2/1995 | Eberwine | 342/357 |
| 5,414,432 A * | 5/1995 | Penny, Jr. et al. | 342/463 |
| 5,418,537 A * | 5/1995 | Bird | 342/457 |
| 5,497,149 A * | 3/1996 | Fast | 340/899 |
| 5,517,683 A * | 5/1996 | Collett et al. | 455/89 |
| 5,572,401 A * | 11/1996 | Carroll | 361/683 |
| 5,587,715 A * | 12/1996 | Lewis | 455/12.1 |
| 5,629,981 A * | 5/1997 | Nerlikar | 380/25 |
| 5,826,195 A * | 10/1998 | Westerlage et al. | 455/456 |

FOREIGN PATENT DOCUMENTS

WO    WO 93/23766    5/1993    ........... G01S/13/74

* cited by examiner

Primary Examiner—Theodore M. Blum
(74) Attorney, Agent, or Firm—Gifford, Krass, Groh, Sprinkle, Anderson & Citkowski, PC

(57) ABSTRACT

A tracking system uses a miniaturized geographic position determination and communications module, preferably in the form of a thin capsule, enabling the enclosure to be hidden in very small spaces, including personal concealment. Electronic circuitry and a thin, rechargeable battery are contained within the enclosure, the circuitry including a global positioning satellite receiver, a communications transceiver, and a controller. The controller causes the global positioning satellite receiver to receive and decode a signal relating to the geographic position of the module; cause the communications transmitter to communicate the geographic position information to a remote location; and disable the global positioning satellite receiver and communications transceiver when not in use so as to conserve power.

9 Claims, 5 Drawing Sheets

TRACKING SYSTEM USING MINIATURIZED CONCEALABLE COMMUNICATIONS MODULE

This application is a continuation of application Ser. No. 08/321,941, filed Oct. 12, 1994, now U.S. Pat. No. 6,121,922.

FIELD OF THE INVENTION

The present invention relates generally to electronic tracking systems and, more particularly, to a tracking system utilizing a highly miniaturized position determination and communications module which may be readily concealed, including on the person of an individual to be located.

BACKGROUND OF THE INVENTION

Wireless geographic position determination systems have evolved to the point where they are commercially affordable and are now important in many applications, including terrain mapping, vehicle tracking, and so forth. Although early ground-based systems such as Loran-C were lacking in accuracy and reliability, with the advent of GPS or global positioning satellite systems, very accurate and reliable geographic fixes may be obtained. U.S. Pat. No. 5,225,842 "Vehicle Tracking System Employing Global Positioning System (GPS) Satellites" provides a useful background, including technical descriptions of previous and existing geographic positioning systems, including the GPS infrastructure.

Along with the evolution of satellite-based positioning systems, telecommunications networks have also evolved to allow mobile communications using very small transceivers, for example, with the hand-held telephones now commonly employed for cellular communications. The advantage of a cellular network, of course, includes the ability to send and receive calls despite changing position within a particular service area.

In some situations, it makes sense to integrate the capabilities of wireless geographical positioning with mobile telecommunications. For this reason, various vehicle tracking systems have evolved which combine certain aspects of satellite-based and mobile communications, including cellular telephony. Once such application is described in U.S. Pat. No. 5,223,844 "Vehicle Tracking and Security System," wherein mobile units include vehicle theft and intrusion protection facilities along with a receiver of signals from a global positioning satellite system. In the event of a security breach, the remote unit automatically communicates position information to a fixed control center over a mobile phone network, enabling the center to monitor the vehicle to solve a problem or apprehend an offender.

It is clear from the above and other references which combine positioning and communications capabilities, however, that miniaturization to an extent which affords concealment within very small remote units to be tracked or on an individual have not been considered. Existing systems, while making an effort in certain cases to hide some or all of their associated components, have not been further required to substantially miniaturize such components, since, particularly in vehicular applications, sufficient volume and operating power are available to operate off-the-shelf constituents without dramatic reductions in physical size. However, if an electronic tracking system is to be concealed within smaller objects or worn on the person, dramatic changes must be made not only to the enclosure and the structure of the components contained therein, but steps must also be taken to manage power control to ensure that power is not drained before such a system becomes critically necessary.

SUMMARY OF THE INVENTION

One aspect of the invention provides a miniaturized geographic position determination and communications module in a small, concealable enclosure. In the preferred embodiment the enclosure is in the form of a thin capsule, enabling the enclosure to be hidden in very small spaces, including concealment on the person. Electronic circuitry and a source of power are contained within the enclosure, with the circuitry including a global positioning satellite receiver, a communications transceiver, and a controller. The controller is at least able to cause the global positioning satellite receiver to receive and decode a signal relating to the geographic position of the module; cause the communications transceiver to communicate the geographic position information to a remote location; and disable the global positioning satellite receiver and communications transceiver when not in use so as to conserve power from the source. The geographic position information may be communicated to a remote location either in response to the activation of a panic function, or after receiving a request from a remote location, which then commences the transmission in response to the request. The controller is preferably further operative to perform a functional self-test of the global positioning satellite receiver and communications transceiver to ensure they are in proper working order.

In terms of physical construction, electronic circuitry of the module is preferably mounted on at least one thin substrate, and in the case of two or more, they are disposed parallel to one another and electrically interconnected within the enclosure. A thin battery is preferably used the power source, and a thin antenna associated with the global positioning satellite receiver is supported on the enclosure. The substrate(s), battery and antenna may thus be supported parallel and in close proximity to one another, enabling all components to be contained on or within a small, capsule-like enclosure.

In a system-level configuration, the miniaturized, readily concealable module is used in conjunction with a portable locating unit operative to receive the geographic position information at the remote location and inform a user as to the location of the miniaturized module. Preferably the portable locating unit further includes a positioning satellite receiver of its own and a display, enabling the locating unit to visually indicate the location of the miniaturized module relative to that of the locating unit.

BRIEF DESCRIPTION OF THE ILLUSTRATIONS

DETAILED DESCRIPTION OF THE PREFERRED EMBODIMENTS

Figure 1:
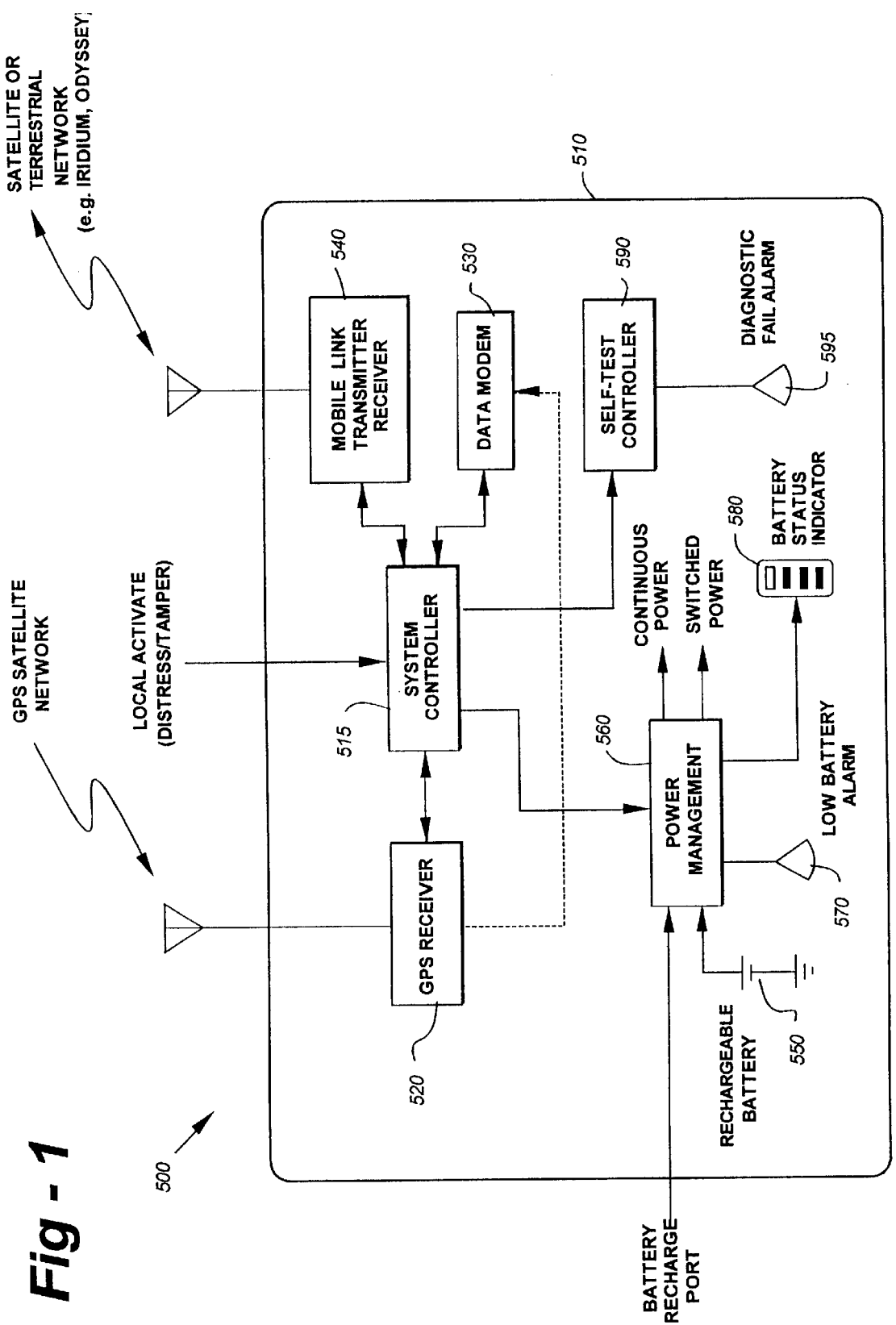
FIG. 1 is a block diagram of a miniaturized geographic position determination and communications module.

The present invention is directed toward electronic tracking, and includes a module which is miniaturized to the extent that it may be readily concealed in very small spaces or even hidden on an individual's person. FIG. 1 illustrates generally at 500 in block diagram form such a miniaturized geographic position determination and communications module. Included is an enclosure 510 having a system controller 515 controlling the transfer of information between various elements of the system 500, including a GPS receiver 520 which is in communication with a GPS satellite network. Geographic position data such as latitude, longitude and altitude, is transmitted to a data modem 530 which cooperates with a communications transmitter/receiver 540 to open a communications link. Position data is thus transmitted to a remote locating unit such as the one depicted in FIG. 4 over a terrestrial or satellite-based communications network.

The system of FIG. 1 is powered by a rechargeable battery 550 and further includes a power management subsystem 560 connected to the rechargeable battery 550 to ensure that the battery 550 is not drained while or before positioning data is being updated and/or transmitted. In the event that battery capacity is low, the power management system 560 transmits a signal to a low power alarm 570. Available battery capacity may be indicated on a battery status LCD 580, also connected to the power management subsystem 560.

The system of FIG. 1 further includes a self-test controller 590, discussed above with reference to FIG. 3, to ensure that all aspects of the system are functioning properly. In the event of a malfunction, the self-test controller transmits a signal to a diagnostic fail alarm 595 which sounds off and alerts the user. The user may be further alerted when a distress signal is received by the system controller 515.

Figure 2:
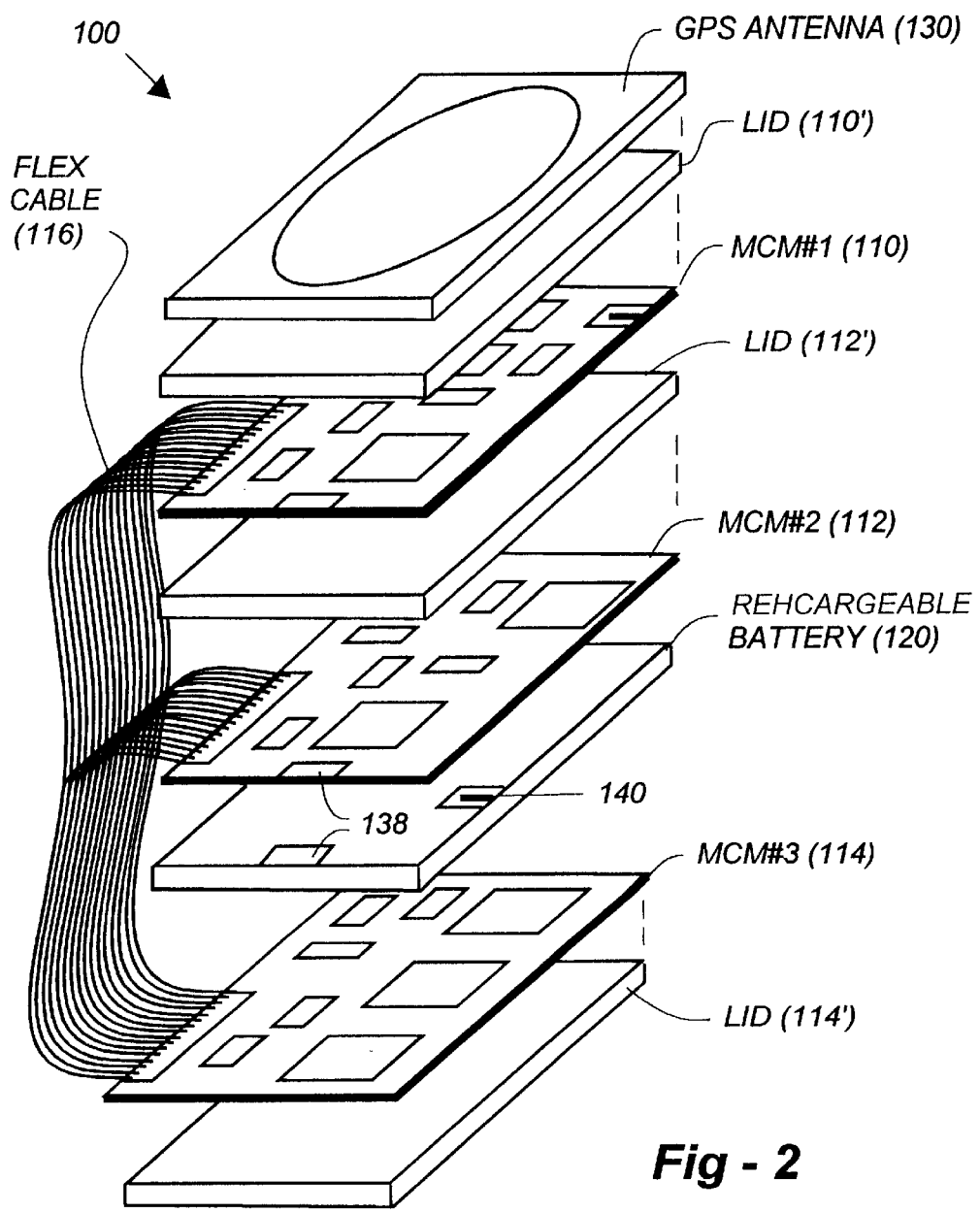
FIG. 2 is an oblique, exploded-view drawing of the miniaturized geographic position determination and communications module.

The preferred construction of the module is depicted generally at 100 in FIG. 2. Broadly, a number of thin, planar components are assembled into a multi-layer sandwich-like structure which is physically small and thin, even in its final assembled form. Depending upon electrical and physical requirements and demands, such a completed module may be on the order of two inches square, more or less, with a thickness of one-half inch, more or less.

A plurality of substrates containing electronic circuitry are shown, including substrates 110, 112 and 114. Although three such substrates are shown, more or fewer may be used depending upon the available level of electronic integration. In the embodiment depicted, multi-chip module (MCM) technology is preferably utilized, resulting in a first MCM 110 completely integrating geographic positioning receiver electronics, a second MCM 112 completely integrating a mobile communications transceiver, the third MCM 114 integrating all necessary remaining electronics, including overall control functions and power management features which will subsequently be described in detail. A flexible cable 116 is preferably used to provide interconnections among the multi chip modules. Use of multi-chip modules greatly improves the long term reliability and ruggedness of the unit-critical to extended lifetime and low duty cycle operation for which the device is intended.

In addition to the electronic subsystems, the module includes a rechargeable battery 120 to power all components and an antenna 130 for use with the global positioning satellite receiver. Although the telecommunications electronics additionally require an antenna, due to the frequency and transmission characteristics involved, such an antenna will be typically very small and is therefore not shown in the figure. In addition to the flexible cable 116 providing interconnections among the electrical subsystems, electrically conductive pads 138 and notches 140 may further be used, for higher-power interconnections, in particular. Various covers 110', 112' and 114' are shown to provide physical separation between the various layers, though, depending upon the number of substrates used and the exact packaging techniques employed, more or fewer of such covers and lids may be required in the final assembled module. In alternate configurations, the layers within the module may be spaced apart with a potting compound being used for final assembly. Regardless of the assembly technique used, the small size permits the unit to be integrated into articles of clothing (jacket, shoe) or to be disguised in some other benign form (i.e., in a wrist watch, pendant, etc.) so as not to attract attention while worn. The small size and autonomous operation further permits implantation and covert operation in articles that are to be tracked (e.g., drugs, currency, artworks, etc.).

In terms of multi-chip module fabrication, the assignee of the present application has direct access to MCM fabrication technology and facilities, and these would preferably be used for the integration of the electronic subsystems. Such technology is described in U.S. Pat. No. 4,458,297 "Universal Interconnection Substrate". Other electronic miniaturization approaches may be used, however, including full-scale integration of entire subsystems, for example, in the form of very large-scale integrated (VLSI) circuits. Suitably miniature rechargeable batteries are manufactured by Ultralife Batteries Inc. of Newark, N.J. The Ultralife Thin Cell models U3VF-D and U3VF-F models in particular are in the size range of roughly three inches square and approximately 0.07 thick, yet provide capacities in the range of several hundred to several thousand milliamp hours at a voltage of three volts using lithium/manganese dioxide ($LiMNO_2$) technology. Such Ultralife cells weigh only up to 20 grams, or thereabouts. As for the GPS satellite receiver antenna, Matsushita Electric Works offers a suitably compact antenna through its U.S. distributor Spectra Systems of Plantation, Florida. For example, the 'EL' models range in size from 0.56 to 3.2 square inches, with peak gains from four to six dBic. Other batteries and antennas may alternatively be used so long as they are suitably compact and meet the performance requirements of the present application.

Figure 3:
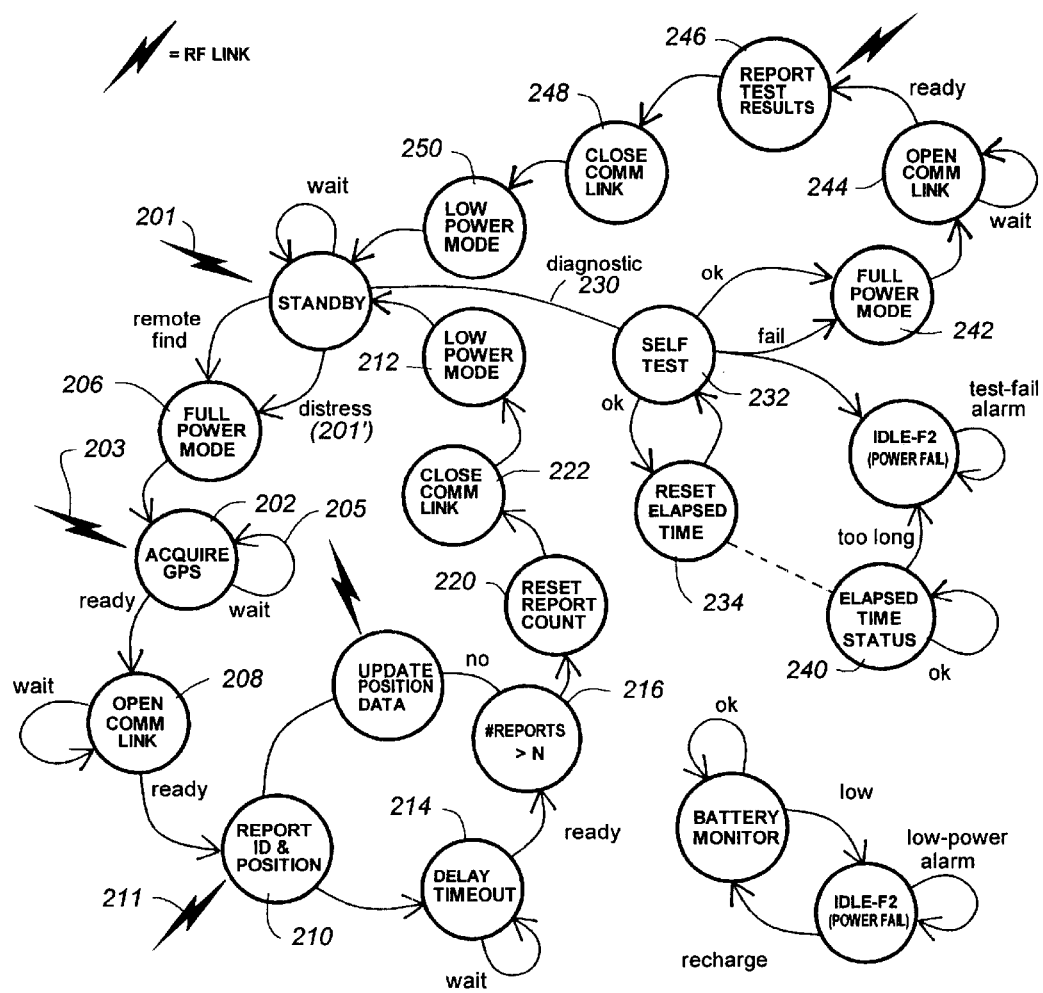
FIG. 3 is a state diagram indicating operational modes of the module.

Now turning to FIG. 3, there is shown a control sequence state diagram associated with the module of FIG. 1. It should first be noted that the shaded nodes STANDBY, IDLE-F1 and IDLE-F2 represent quiescent or non-active states, and the lighting-bolt symbols represent the introduction of an RF signal, whether from a satellite or through a telecommunications network. The system remains in the STANDBY state until a remotely-generated locate-request signal is received, as shown by symbol 201, or if a distress signal is initiated, as indicated by path 201'.

Local activation of this distress signal may occur in a number of ways, for example, through tampering with the module or by an intentional action of the one carrying the module. In terms of tampering, a "breaking" of the circuit associated with the module might be used to initiate activation, for example, by the removal or disturbance of a wristband or bracelet, or the involvement of a skin-contact type of sensor. With regard to an intentional activation, one or more "panic" buttons might be provided, for example on opposite sides of the unit which must be pressed simultaneously, or, alternatively, an optional voice training/ recognition circuit may be included in the module to bring about activation through the enunciation of a code word or phrase. Both speaker-independent and -dependent voice recognition systems are now commercially available, and since, in this particular application, only one or a few words need be recognized, integration to a level in keeping with the small size of the invention should be readily achievable. Additionally, speaker-dependent activation, which requires training but is typically less technically sophisticated than speaker-independent algorithms, may in fact be more desirable in this application, since it provides further assurance that the module will not accidentally be activated by the wrong person saying the correct word(s).

Upon activation, the system enters a full power mode state as shown at node 206, then enters an "acquire GPS position" state as shown at node 202. When a positioning signal is received, as indicated by symbol 203, the system remains in this state, as indicated by loop line 205, until a geographic fix has been determined. At this point, the system enters a ready state and a communications link is opened, as shown at node 208. The system remains in this state until a link has been established, at which point a ready condition is entered, and identification and position information are transmitted according to node 210, as shown by symbol 211.

The reduced size and weight of the module enhances mobility and orientation-range, thereby improving the likelihood that prolonged loss of signal will not occur due to structural or natural interference (i.e., buildings, vehicles, foliage, terrain). However, additional sensing logic may also be added (within loop 205) to interrogate the GPS signal strength and, if the signal level is determined to be insufficient to permit a position fix, cause the unit to enter a mode whereby the GPS signal will be periodically polled until such time that it is of sufficient levels to acquire position. At this point, the unit will proceed with normal operation and open the communications link to transmit the position data (node 211).

Having reported position, the system immediately enters a delayed timeout state as indicated by node 214, and waits for a predetermined period of time, before automatically sending a subsequent report of the same or a different position. As indicated at node 216, in the preferred embodiment, up to N reports will be attempted to ensure that the monitoring facility obtains an accurate position, with the delayed timeout mode being entered at all possible points to conserve power. If N reports have not been transmitted, the position data is again updated, and a report is transmitted. As shown at node 216, once N reports have been transmitted, the report counter is reset at node 220 and the cellular link is closed at node 222. After the communication link is closed, the system enters a low-power mode, as indicated at node 212.

A secondary loop provides a self-test mode for diagnostic purposes, which is entered along path 230 to node 232. In the event that the self-test of 232 succeeds, an elapsed time register will be reset according to node 234, indicating to a watchdog monitor, 240, that a successful self-test has occurred within a prescribed time interval. In the event that a self-test cannot be performed, the elapsed time value of 234 will exceed a preset threshold and the watchdog monitor 240 will force transition to the IDLE-F1 mode which preferably signals some form of alarm to show that the system is non-operational.

As part of the self-test loop, the system will achieve full power at node 242, open a communication link at node 244, report the results of the test at node 246, close the communication link at node 248, and once again enter a lower power mode, as indicated at node 250, from which the system will preferably again enter the STANDBY state. Various functions may be performed as part of this self-test loop. For example, as part of a more rigorous self-test mode, the GPS receiver may be activated as well as the telecom link and used to gather information relating to geographical positioning, which may then be stored and transmitted over the telecom link to and then back from the monitoring facility, and subsequently compared to the originally stored value. In the event of an exact match, this should prove that all aspects of the system are functioning properly, including the satellite receiving capabilities, mobile telecommunications facilities in both directions, and power management functions. The small loop in FIG. 3 involving the IDLE-F2 loop forms part of a low-power alarm which monitors battery capacity and causes the system to remain in a low-power alarm mode in the event that insufficient power is available for normal functioning.

Figure 4:
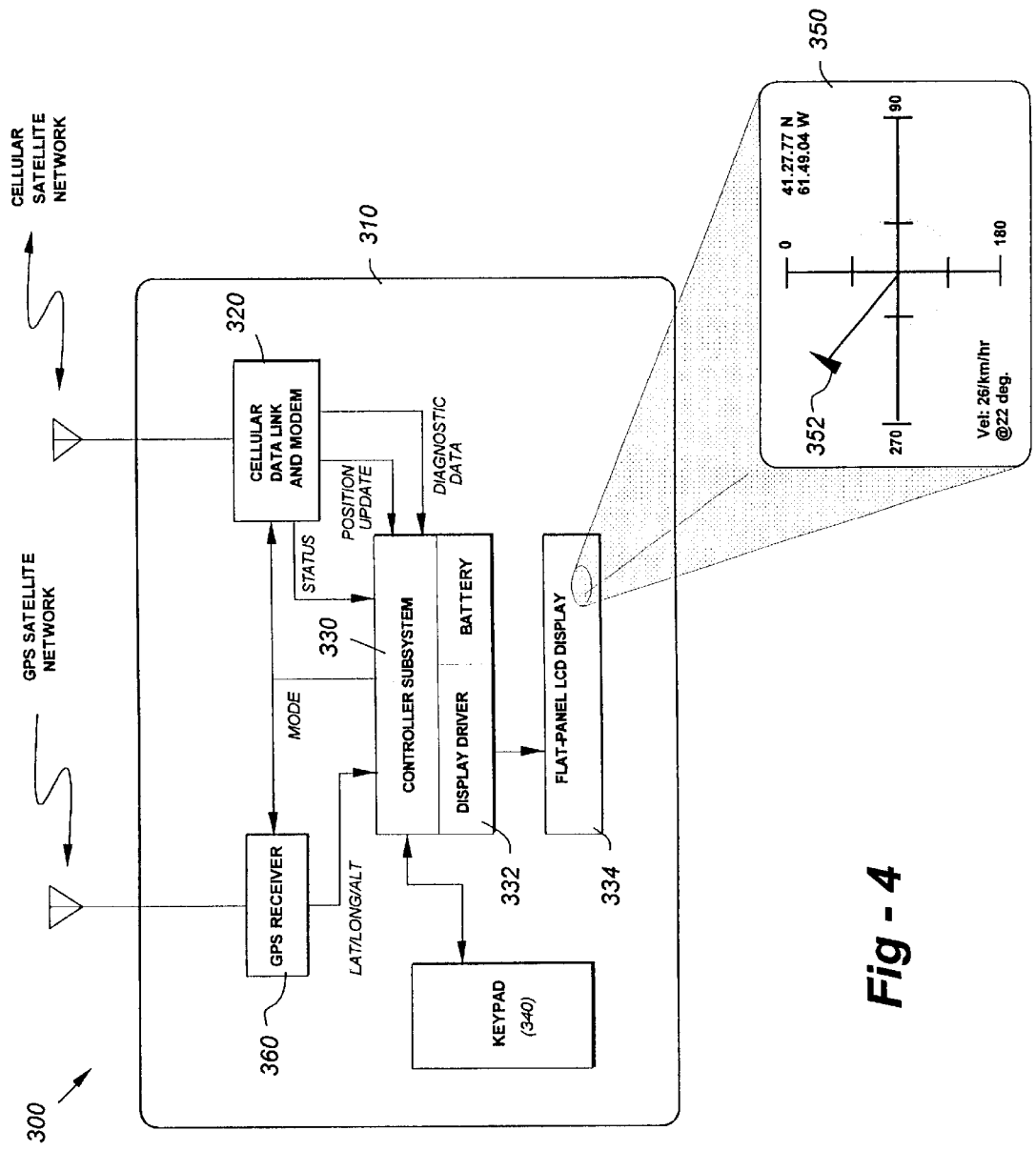
FIG. 4 is a block diagram of a portable locating unit which may be used in conjunction with the module to enable a mobile monitoring facility to track an object or individual carrying the module.

FIG. 4 illustrates generally at 300 in block diagram form a portable locating unit which may be used as a companion to the module described with reference to FIGS. 2 and 3, this portable locating unit forming part of a mobile monitoring facility. Overall, the system includes an enclosure 310 having a cellular transceiver 320 in communication with the module 100 (directly or via a monitoring facility 404) and controller subsystem 330 receiving status, position updates, and diagnostic data through a datalink and modem forming part of the cellular transceiver 320. The controller subsystem 330 formats positional and other data using driver 332 for its display, preferably on a low-power flat-panel liquid crystal display 334. A keypad 340 enables the user to enter operational commands.

Preferably, the display format, shown at 350, provides geographical coordinates associated with the position of the remote module 100, as depicted by symbol 352. With the addition of an optional GPS receiver 360, the display 350 may be used to show the position of both the module carried by the item or individual to be located and the position of the portable locating unit 300 in physical relationship with respect to one another. As such, then, the portable unit 300 includes certain of the features present in the module 100, but further includes a user input and output display device, and, since, the unit 300 need not necessarily be concealed, it does not have to be miniaturized to the extent of the module 100.

Figure 5:
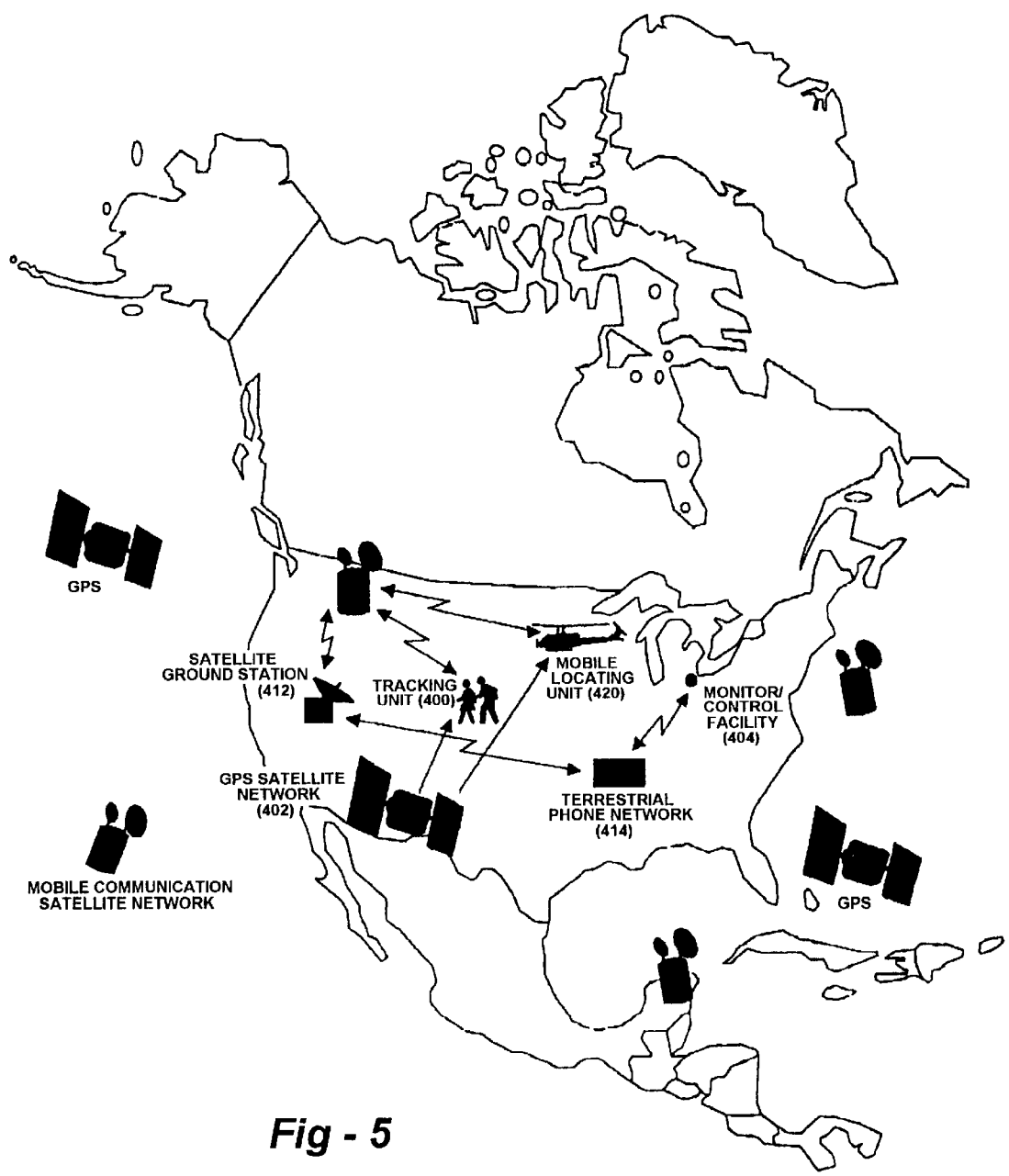
FIG. 5 is a simplified terrain map used to show how the present invention makes advantageous use of existing satellite positioning and mobile telecommunications infrastructures.

FIG. 5 shows a simplified overview of a geographic area, in this case, North America, used to illustrate how the invention interacts with various information and communications network infrastructures. Assuming that the miniaturized module is affixed to an individual 400 being abducted, geographic positioning information is downloaded and received from one or more GPS satellites 402. Although individual 400 may be constantly on the move, new geographic fixes are downloaded and maintained, with this information being preferably relayed to a monitor/control facility 404 through a telecommunications network which might include a mobile satellite 410, satellite downlink 412 and terrestrial node 414, the latter being in final communication with monitor/control facility 404. Although the miniaturized module being carried by individual 400 is shown to be in communication with a mobile communication satellite 410, it is understood that, depending upon the telecommunications network in use and other such circumstances, geographical updates may be relayed directly to a terrestrial node, for example, as an alternative.

Also shown in FIG. 5 is a mobile locating unit 420 which is also in communication with the telecommunications network and optionally in communication with a geographic positioning system, including the same satellite network providing positioning information to the tracking unit on the individual 400 being tracked. Presumably the mobile locating unit 420 will make use of a system similar or identical to the portable unit described with reference to FIG. 4, and, in the event that this portable unit also includes a geographic positioning subsystem and suitable display, the position of both the individual 400 and the mobile locating unit 420 may be simultaneously displayed with their positions relative to one another so as to indicate the progress made in closing the gap between the individual 400 being tracked and the mobile locating unit 420. The relative position (versus absolute position) accuracy of two GPS units is extremely high so differential GPS techniques will not be required to bring the mobile locating unit 420 into co-location with the individual 400. Although a helicopter is depicted as the mobile locating unit 420 in FIG. 5, obviously any mobile locating unit may be utilized including a vehicle, ship, plane, as well as an individual utilizing a hand-held locating unit.

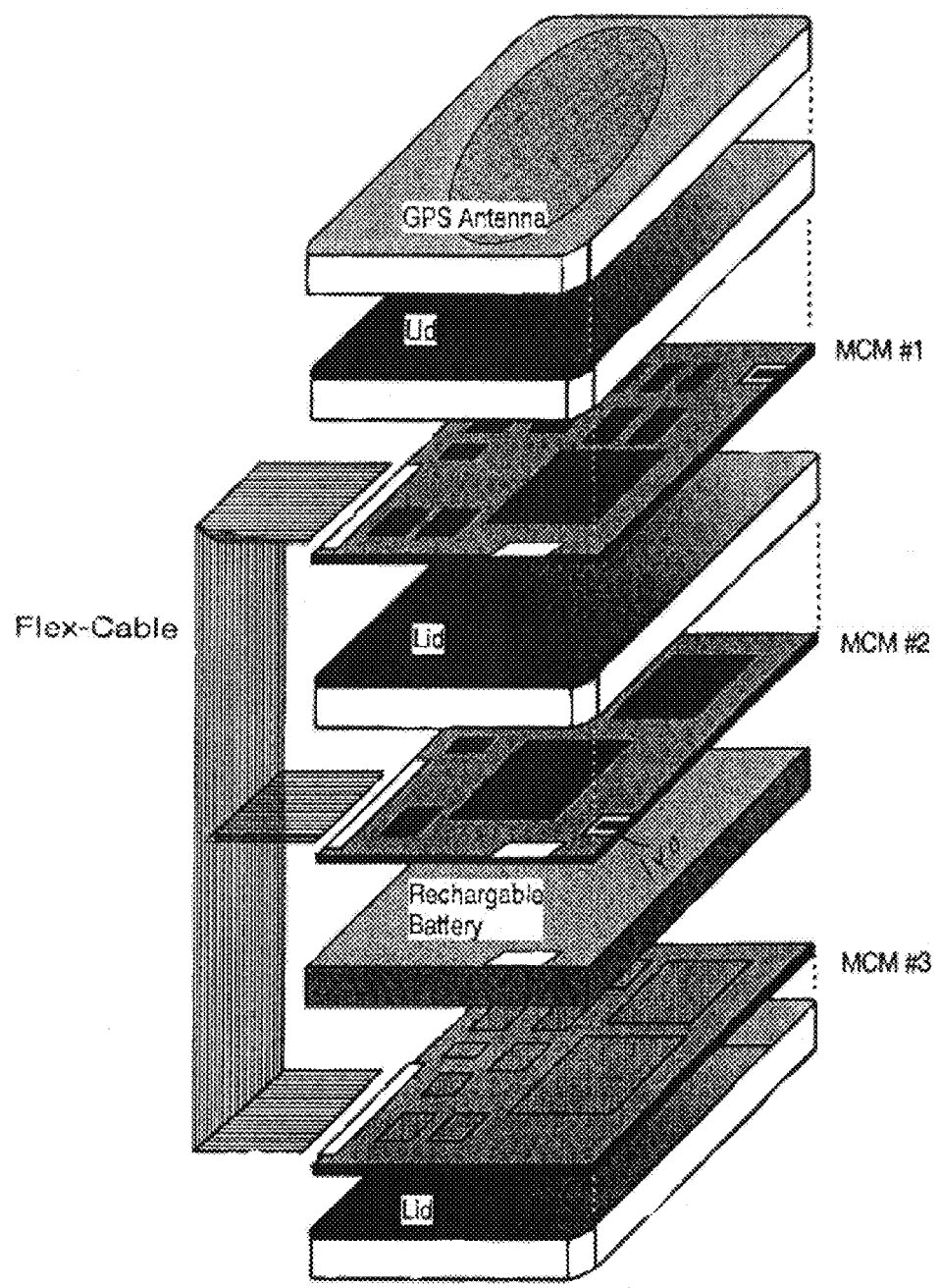

Having thus described my invention, I claim:

1. A portable miniaturized geographic position determination and communications module adapted for use with a global positioning satellite system, the module comprising:
   an enclosure, the physical dimensions of which are sufficiently small to permit personal concealment;
   electronic circuitry disposed within the enclosure. the circuitry including:
      voice recognition circuitry,
      a global positioning satellite receiver,
      a communications transmitter, and
      a controller operative to perform the following functions:
         cause the global positioning satellite receiver to receive and decode a signal from one or more global positioning satellites containing information relating to the geographic position of the module, and
         cause the communications transmitter to communicate the position information to a remote location upon recognition of a predetermined spoken code word or phrase.

2. The module of claim 1, the enclosure being in the form of a thin capsule.

3. The module of claim 2, the electronic circuitry being mounted on a plurality of thin substrates disposed parallel to one another and electrically interconnected within the enclosure.

4. The module of claim 1, including a thin antenna supported on the enclosure associated with the global positioning satellite receiver.

5. The module of claim 1, the controller being further operative to perform a functional self-test of the global positioning satellite receiver and the communications transmitter.

6. The module of claim 1, further including a communications receiver, and wherein the controller is further operative to receive a request from a remote location and cause the communications transmitter to communicate the information in response to the request.

7. The module of claim 1, the enclosure being in the form of a pendant.

8. The module of claim 1, the enclosure being in the form of a bracelet or wristband.

9. The module of claim 8, the controller being further operative to cause the communications transmitter to communicate the position information upon removal or disturbance of the bracelet or wristband.

* * * * *

UNITED STATES PATENT AND TRADEMARK OFFICE
CERTIFICATE OF CORRECTION

PATENT NO.    : 6,657,587 B1
DATED         : December 2, 2003
INVENTOR(S)   : Paul L. Mohan It is certified that error appears in the above-identified patent and that said Letters Patent is hereby corrected as shown below:

Title page
Item [57], ABSTRACT,
Line 14, insert the following after "power."
-- The geographic position information may be communicated to a remote location either in response to a carrier activating a panic function or after receiving a request from a remote location which commences the transmission in response to the request. In a system-level configuration, the miniaturized module is used in conjunction with a portable locating unit operative to receive the geographic position information at the remote location and inform a user as to the location of the minaturized module. Preferably the portable locating unit further includes a positioning satellite receiver of its own and a display, enabling the locating unit to visually indicate the location of the miniaturized module relative to that of the locating unit. --
Item [56], References Cited, U.S. PATENT DOCUMENTS, add
-- 5,568,119 * 10/22/96 Schipper et al.
   5,613,223 *  3/18/97 Ross et al. 455/89 --

Drawings,
Please insert Figure 6 on the attached drawing sheet.

Column 2,
Line 34, replace "used the power" with -- used as power --.

Column 4,
Line 51, replace "lighting-bolt" with -- lightning-bolt --.

Signed and Sealed this

Thirty-first Day of August, 2004

JON W. DUDAS
*Director of the United States Patent and Trademark Office*